US008446352B2

(12) United States Patent
You

(10) Patent No.: US 8,446,352 B2
(45) Date of Patent: May 21, 2013

(54) APPARATUS AND METHOD OF CONVERTING DATA, APPARATUS AND METHOD OF DRIVING IMAGE DISPLAY DEVICE USING THE SAME

(75) Inventor: Tae Ho You, Incheon-si (KR)

(73) Assignee: LG Display Co., Ltd., Seoul (KR)

( * ) Notice: Subject to any disclaimer, the term of this patent is extended or adjusted under 35 U.S.C. 154(b) by 965 days.

(21) Appl. No.: 11/730,468

(22) Filed: Apr. 2, 2007

(65) Prior Publication Data

US 2007/0229426 A1 Oct. 4, 2007

(30) Foreign Application Priority Data

Apr. 3, 2006 (KR) .......................... 10-2006-030214

(51) Int. Cl.

| | |
|---|---|
| ***G09G 3/36*** | (2006.01) |
| ***G09G 5/10*** | (2006.01) |
| ***G06K 9/00*** | (2006.01) |
| ***G06K 9/40*** | (2006.01) |

(52) U.S. Cl.

USPC ............. 345/89; 345/204; 345/690; 345/694; 382/254; 382/260; 382/264; 382/266; 382/274

(58) Field of Classification Search

USPC ............ 345/89, 204, 428, 690, 694; 382/260, 382/264, 274, 275, 254, 266

See application file for complete search history.

(56) References Cited

U.S. PATENT DOCUMENTS

| | | | | |
|---|---|---|---|---|
| 5,231,519 | A * | 7/1993 | Koike | 358/3.07 |
| 5,479,584 | A * | 12/1995 | Curry | 358/1.2 |
| 5,559,530 | A * | 9/1996 | Yamashita et al. | 345/611 |
| 5,572,603 | A * | 11/1996 | Koike | 382/199 |
| 5,572,606 | A * | 11/1996 | Tanioka | 358/3.08 |
| 5,835,117 | A | 11/1998 | Small | |
| 6,043,853 | A * | 3/2000 | Shimazaki et al. | 348/625 |
| 6,154,575 | A * | 11/2000 | Hashimoto | 382/258 |
| 6,289,126 | B1 * | 9/2001 | Ishisaka | 382/205 |
| 6,373,991 | B1 * | 4/2002 | Shimazu et al. | 382/266 |
| 6,624,825 | B1 * | 9/2003 | Fujiyoshi | 345/698 |
| 6,647,152 | B2 * | 11/2003 | Willis et al. | 382/275 |

(Continued)

FOREIGN PATENT DOCUMENTS

| | | |
|---|---|---|
| CN | 1623165 A | 6/2005 |
| CN | 1750089 A | 3/2006 |

(Continued)

OTHER PUBLICATIONS

Taiwanese Office Action dated Mar. 15, 2012, with English translation.

(Continued)

*Primary Examiner* — Bipin Shalwala
*Assistant Examiner* — Matthew Fry
(74) *Attorney, Agent, or Firm* — Morgan, Lewis & Bockius LLP

(57) ABSTRACT

The present invention relates to an apparatus and method of converting data to display smooth and vivid images and to improve the gray scale use efficiency. The apparatus of converting data includes a gray scale detector that that generates a gray scale detection signal and a gray scale change signal by detecting a same gray scale, from an M bit input data, in a plurality of pixels adjacent to one another. The apparatus of converting data further includes a gray scale corrector that generates an N bit data by correcting one of the same gray scale according to the gray scale detection signal and the gray scale change signal output from the gray scale detector, wherein N and M are integers, N being larger than M.

12 Claims, 8 Drawing Sheets

U.S. PATENT DOCUMENTS

| | | | | |
|---|---|---|---|---|
| 6,707,940 | B1 * | 3/2004 | Qian | 382/173 |
| 6,897,981 | B2 * | 5/2005 | Shimamura | 358/3.06 |
| 6,915,319 | B1 * | 7/2005 | Sato | 708/313 |
| 6,980,258 | B1 * | 12/2005 | Matsunaga | 348/625 |
| 2001/0035969 | A1 * | 11/2001 | Kishimoto | 358/1.9 |
| 2005/0162427 | A1 * | 7/2005 | Momozono et al. | 345/467 |
| 2005/0180654 | A1 * | 8/2005 | Zhu | 382/269 |
| 2005/0259058 | A1 * | 11/2005 | Yamaguchi et al. | 345/87 |
| 2006/0171473 | A1 * | 8/2006 | Schoner | 375/240.27 |
| 2007/0286515 | A1 * | 12/2007 | Kim et al. | 382/254 |
| 2009/0040246 | A1 * | 2/2009 | Miyasaka | 345/698 |
| 2010/0134496 | A1 * | 6/2010 | Bhaskaran et al. | 345/428 |

FOREIGN PATENT DOCUMENTS

| | | | |
|---|---|---|---|
| JP | 63-015576 | | 1/1988 |
| JP | 2003-304400 | | 10/2003 |
| JP | 2004-054210 | | 2/2004 |
| JP | 2005-221593 | A | 8/2005 |
| JP | 2006-221593 | | 8/2005 |
| KR | 1020030093129 | A | 12/2003 |
| KR | 1020050015338 | A | 2/2005 |
| TW | 1352854 | A | 9/2006 |
| TW | I352854 | A | 9/2006 |
| WO | WO 2007/063771 | A1 | 6/2007 |

OTHER PUBLICATIONS

Chinese Office Action dated Nov. 28, 2008, and English translation.

Office Action issued in Korean Patent Application No. 10-2006-0030214 dated Jun. 8, 2012.

* cited by examiner

APPARATUS AND METHOD OF CONVERTING DATA, APPARATUS AND METHOD OF DRIVING IMAGE DISPLAY DEVICE USING THE SAME

This application claims the benefit of Korean Patent Application No. 2006-30214 filed on Apr. 3, 2006, which is hereby incorporated by reference.

BACKGROUND OF THE INVENTION

1. Field of the Invention

The present invention relates to an apparatus and method of converting data, and more particularly, to an apparatus and method of converting data to display smooth and vivid images and to improve the gray scale use efficiency, and an apparatus and method of driving image display devices using the same.

2. Discussion of the Related Art

Recently, various flat display devices that can overcome disadvantageous properties, including the large weight and size, of cathode ray tubes (CRT) have been developed. For example, there are liquid crystal display devices (LCD), plasma display panels (PDP), and light emitting displays (LED). The LCD device displays images by applying an electric field to a liquid crystal layer formed between two glass substrates therein, and controlling the intensity of electric field so as to control the transmittance of light through the liquid crystal layer. The PDP displays images using plasma generated by gas discharge. The LED displays images by luminescence of organic or polymer substance.

Devices including the digital camera, camcorder, and scanner convert natural images into data with a predetermined resolution. Generally, a host system including personal computer, notebook computer, and television that drives the flat display device uses digital data that are discretized into an 8 bit data. Accordingly, as shown in FIG. 1A, the gray scales of the virtual image to be displayed, in which gray scale smoothly increases from A to B, is converted into an 8 bit data, in which the gray scale increases discontinuously from A to B, as shown in FIG. 1B.

In order to display an image that is substantially identical to the virtual image using a limited resolution, i.e., 8 bit data, it is necessary to perform a compensation process using various signal processing technologies corresponding to human viewing properties. Without such compensation process, the gray scale of the image converted into the data on the basis of 8 bit input/output gamma property curve may become indistinguishable in areas where the first derivative, i.e., slope, of the gamma property curve is smaller than 1. Here, the X-axis of the gamma property curve is the 8 bit input data and the Y-axis of the gamma property curve is the 8 bit output data.

In the area where the first derivative of gamma property curve, relating the 8 bit output data to input data, is smaller than 1, as shown in area C of FIG. 2A, the input gray scales 51 and 52 are mapped to the points of output gray scale 41.2 and 41.4, shown in FIG. 2B. However, since the digital output can be represented only as the integer, the input gray scales 50, 51 and 52 are displayed as output gray scale 41. Accordingly, it is difficult to distinguish the input gray scale 50, 51, and 52 by viewing the output gray scale that is displayed. Thus, the picture quality is deteriorated in the display device due to the gray scale indistinguishability.

SUMMARY OF THE INVENTION

Accordingly, the present invention is directed to an apparatus and method of converting data and an apparatus and method of driving display devices using the same that substantially obviate one or more problems due to limitations and disadvantages of the related art.

An object of the present invention is to provide an apparatus and method of converting data to represent smooth and vivid images and to improve the gray scale use efficiency, and an apparatus and method of driving image display devices using the same.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the apparatus for converting data includes a gray scale detector that detects a same gray scale, from an M bit input data, in a plurality of pixels adjacent to one another, and a gray scale corrector that generates an N bit data by correcting one of the same gray scale according to a detection signal output from the gray scale detector, wherein N and M are integers, N being larger than M.

In another aspect, the apparatus of driving an LCD device includes an LCD panel that displays images, a data conversion apparatus that converts an M bit input data into an N bit data, wherein M and N are integers, N being larger than M, a gate driver that supplies a scan pulse to the LCD panel, an N bit data driver that supplies an analog video signal to the LCD panel, and a timing controller that supplies the N bit data output from the data conversion apparatus to the N bit data driver and controls the gate and data drivers, wherein the data conversion apparatus includes a gray scale detector that detects a same gray scale among pixels positioned adjacently from the M bit input data, a gray scale corrector that generates the N bit data by correcting the same gray scale according to a detection signal output from the gray scale detector.

In another aspect, the method of converting data includes detecting a same gray scale, from an M bit input data, in a plurality of pixels adjacent to one another, and generating an N bit data by correcting one of the same gray scale according to a detection signal output from the gray scale detector, wherein N and M are integers, N being larger than M.

In another aspect, the method of driving an image display device to represent images on a display panel includes converting an M bit input data into an N bit data, wherein M and N are integers, N being larger than M, supplying a scan pulse to the display panel, and converting the N bit data to an analog video signal in synchronization with the scan pulse, and supplying the analog video signal to the display panel, wherein converting the M bit data into the N bit data comprises detecting a same gray scale among pixels positioned adjacently from the M bit input data and generating the N bit data by correcting the same gray scale of pixels according to a detection signal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1A:
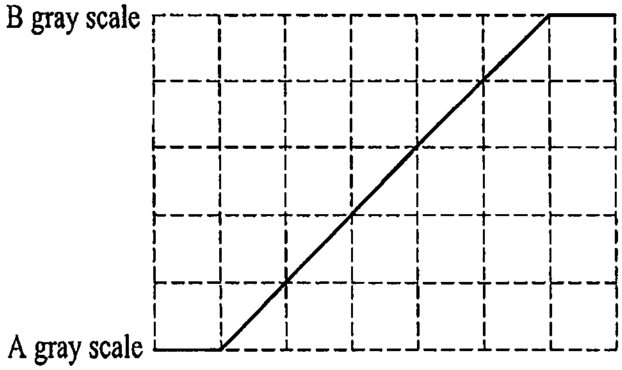
FIG. 1A Related Art
FIG. 1A is a graph illustrating virtual images in which the gray scale is continuously increased from A gray scale to B gray scale.
Figure 1B:
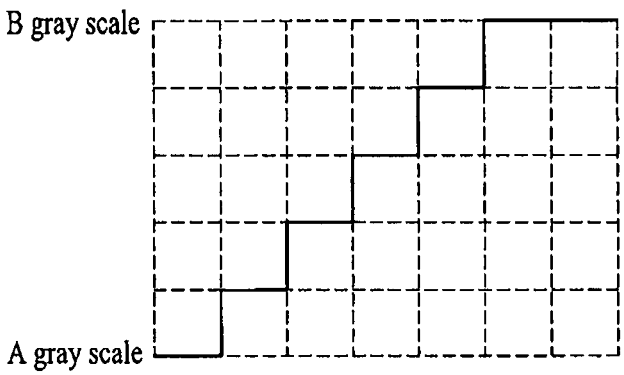
FIG. 1B Related Art
FIG. 1B is a graph illustrating discretized images of the virtual images shown in FIG. 1A.
Figure 2A:
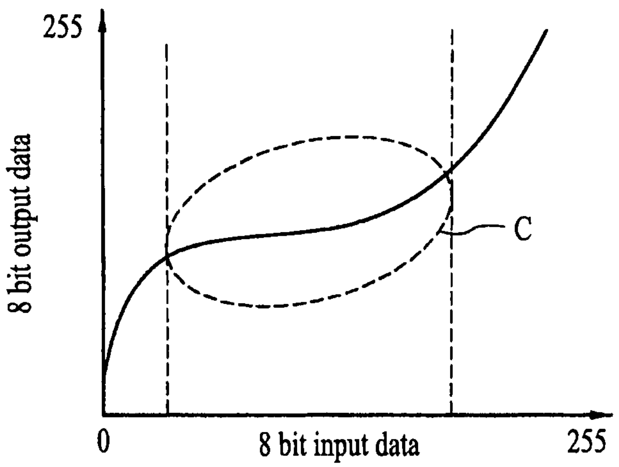
FIG. 2A Related Art
FIG. 2A is an exemplary graph of illustrating a gamma property curve of 8 bit output data to input data.
Figure 2B:
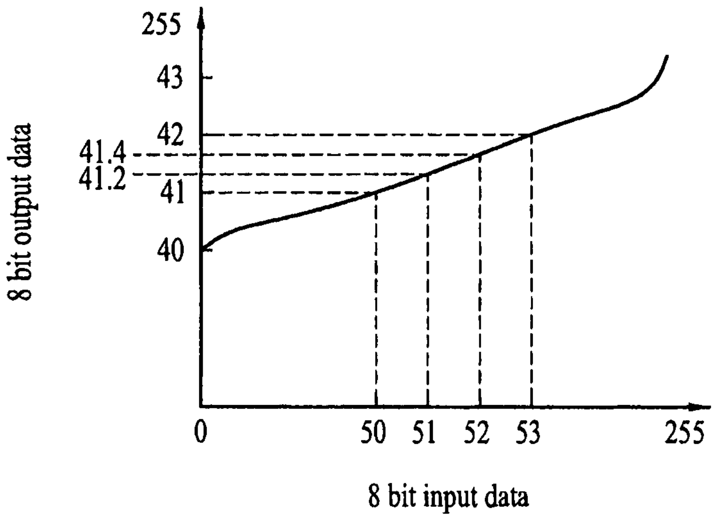
FIG. 2B Related Art
FIG. 2B is a graph of illustrating C of FIG. 2A.
Figure 3:
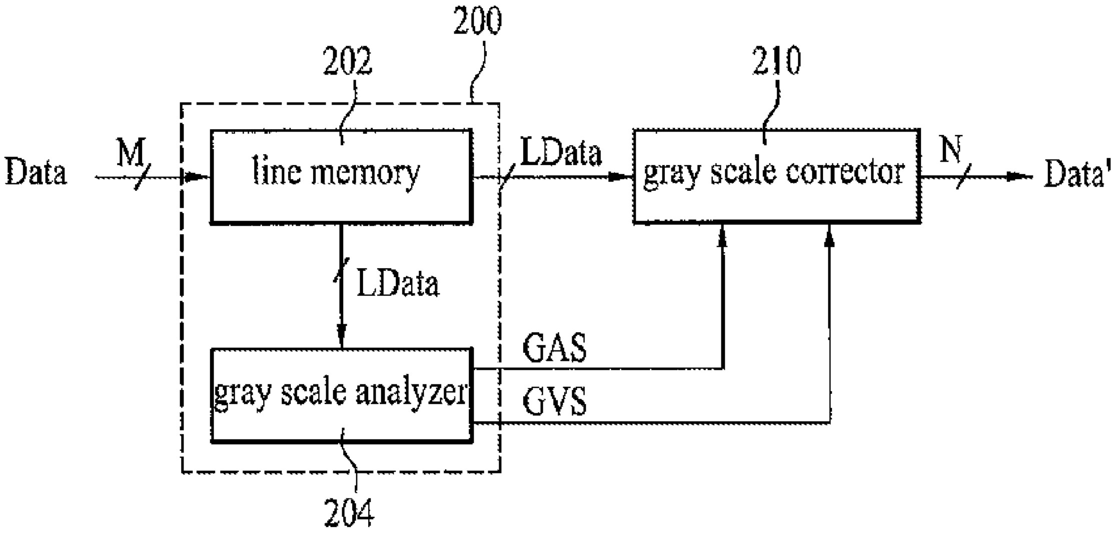
FIG. 3 is a block diagram illustrating an exemplary data conversion apparatus according to the preferred embodiment of the present invention.

FIG. 3 is a block diagram illustrating an exemplary data conversion apparatus according to the preferred embodiment of the present invention. As shown in FIG. 3, a data conversion apparatus according to the present invention includes a gray scale detector 200 that generates a gray scale detection signal (GAS) and a gray scale change signal (GVS) by detecting a gray scale of pixels that are positioned adjacently in horizontal and vertical directions from an M bits (hereinafter, 8 bits) input data (Data). The data conversion apparatus 110 further includes a gray scale corrector 210 that generates N bits (hereinafter, 10 bits) output data (Data') by compensating for the gray scale of 8 bit input data in response to the gray scale detection signal (GAS) and the gray scale change signal (GVS), wherein N is an integer greater than M.

The gray scale detector 200 includes a line memory 202 that stores the 8 bit input data (Data) by each horizontal line and a gray scale analyzer 204 that generates the gray scale detection signal (GAS) and gray scale change signal (GVS) after analyzing the stored 8 bit data (LData) supplied from the line memory 202. The line memory 202 includes at least three line memories to store the 8 bit input data (Data) by each horizontal line.

The gray scale analyzer 204 detects a gray scale overlap area, wherein the grayscale of at least two adjacent pixels have the same gray scale, by comparing the gray scale among the pixels being positioned adjacently in horizontal and vertical directions from the stored 8 bit data (LData) of at least three horizontal lines. Thereafter, the gray scales analyzer 204 generates a gray scale detection signal (GAS) indicating the position of gray scale overlap area, and a gray scale change signal (GVS) indicating the gray scale change of adjacent pixels.

Figure 4:
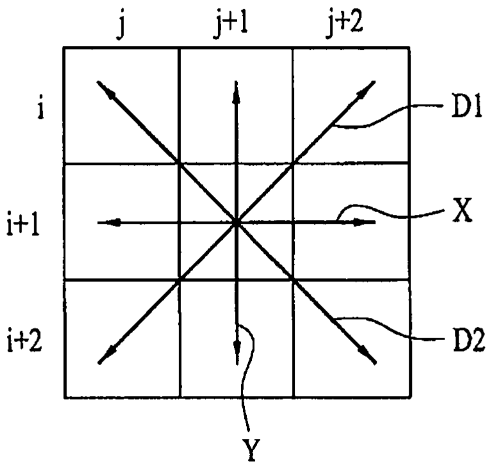
FIG. 4 is a diagram showing directions in which a change of gray scale among adjacent pixels is analyzed.

As shown in FIG. 4, the gray scale analyzer 204 compares the gray scale of pixels provided in the X-axis direction (X), the Y-axis direction (Y) and the diagonal directions (D1, D2) of I*J block unit to thereby detect the gray scale overlap area having the same gray scale. Here, 'I' and 'J' are integers greater than or equal to 3, and 'I' and 'J' may be identical to each other or be different from each other. In this example, I and J are both chosen to be 3. The gray scale analyzer 204 detects the position of pixels having the same gray scale among the plurality of pixels provided in the horizontal direction (X), the vertical direction (Y), and the diagonal directions (D1, D2) and creates a gray scale detection signal (GAS). Thereafter, the gray scale analyzer 204 supplies the gray scale detection signal (GAS) corresponding to each gray scale overlap area to the gray scale corrector 210. The number of the gray scale detection signals (GAS) may be one or more based on the number of gray scale overlap areas.

In addition, the gray scale analyzer 204 generates a gray scale change signal (GVS) corresponding to the change of gray scale in each direction (X, Y, D1, D2). At this time, the gray scale change signal (GVS) is provided with the gray scale of the image that is stored in the I*J block unit. And the gray scales change signal (GVS) includes change of signals in at least one of a plurality of directions among left side<->right side, upper side<->lower side, left upper corner<->right lower corner, and left lower corner<->right upper corner.

The gray scale corrector 210 converts the 8 bit stored data (LData) of I*J block unit, supplied from the line memory 202, into a 10 bit data and outputs the corrected 10 bit data (Data') after correcting the gray scale of gray scale overlap areas as indicated by the gray scale detection signal (GAS) using the gray scale change signal (GVS).

Figure 5A:
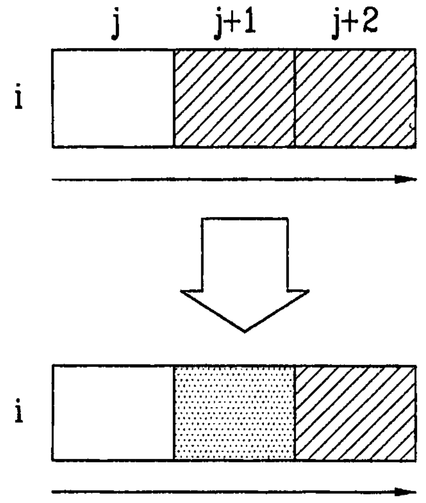
FIGS. 5A to 5C illustrate examples of gray scale correction by a gray scale corrector.

For example, as shown in FIG. 5A, suppose that the 'j+1' pixel of 'i' horizontal line, the 'j+2' pixel of 'i' horizontal line have the same 8 bit gray scales, whereas the gray scales of 'i' horizontal line changes from the left side to the right side. In this case, the 8 bit gray scale of each pixel is corrected to the 10 bit gray scale by the gray scale corrector 210, and the 10 bit gray scale of 'j+1' pixel is corrected to the 10 bit gray scale between the 'j' pixel and the 'j+2' pixel according to the gray scale change signal (GVS) in the direction of left side<->right side.

Figure 5B:
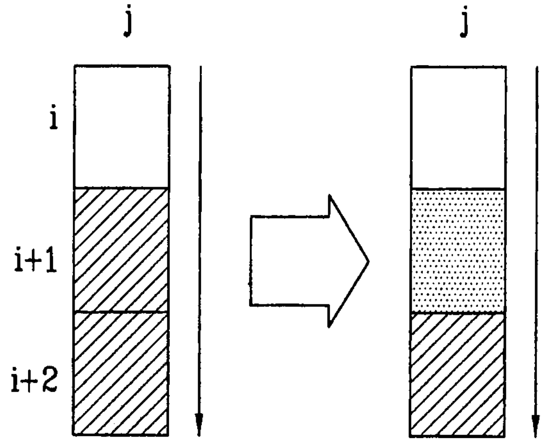

As shown in FIG. 5B, supposes that the 'i+1' pixel of 'j' vertical line and the 'i+2' pixel of 'j' vertical line have the same 8 bit gray scale, whereas the gray scales of 'j' vertical line changes from the upper side to the lower side. In this case, the gray scale corrector 210 corrects the 8 bit gray scale of each pixel to the 10 bit gray scale, and also corrects the 10 bit gray scale of 'i+1' pixel to the 10 bit gray scale between the 'i' pixel and the 'i+2' pixel according to the gray scale change signal (GVS) in the direction of upper side<->lower side.

Figure 5C:
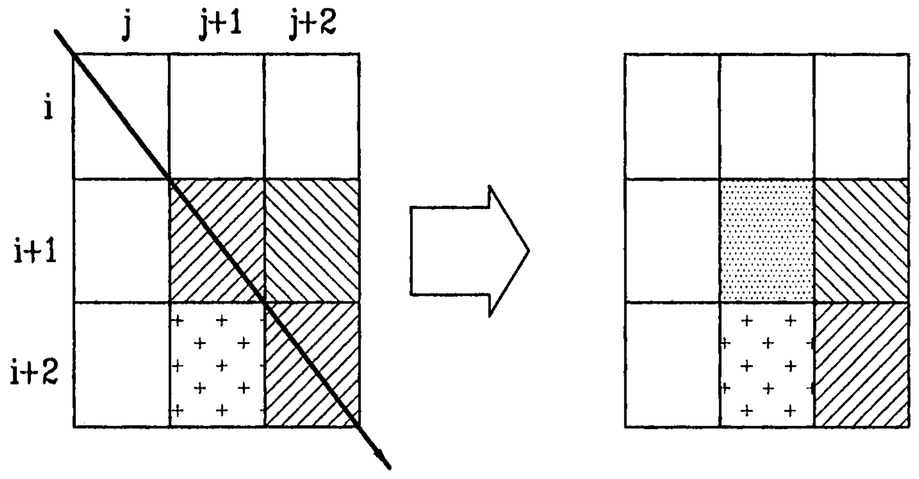

As shown in FIG. 5C, among the nine pixels of 3*3 block unit, suppose that the pixels of (i+1, j+1) and (i+2, j+2) have the same 8 bit gray scale, whereas the gray scale of 3*3 block unit changes in the diagonal direction from the left upper corner to the right lower corner. In this case, the gray scale corrector 210 corrects the 8 bit gray scale of each pixel to the 10 bit gray scale, and also corrects the 10 bit gray scale of pixel of (i+1, j+1) to the 10 bit gray scale between the pixel of (i, j) and the pixel of (i+2, j+2) according to the gray scale change signal (GVS) in the diagonal direction from the left upper corner to the right lower corner.

Figure 6A:
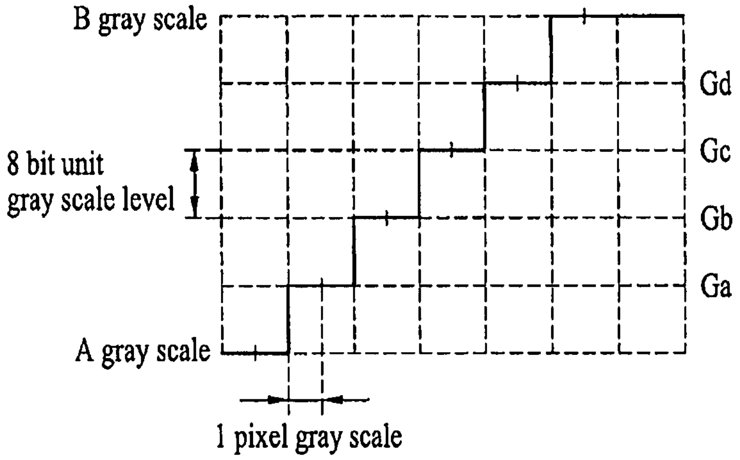
FIG. 6A is an exemplary graph illustrating input data input to a data conversion apparatus shown in FIG. 3.
Figure 6B:
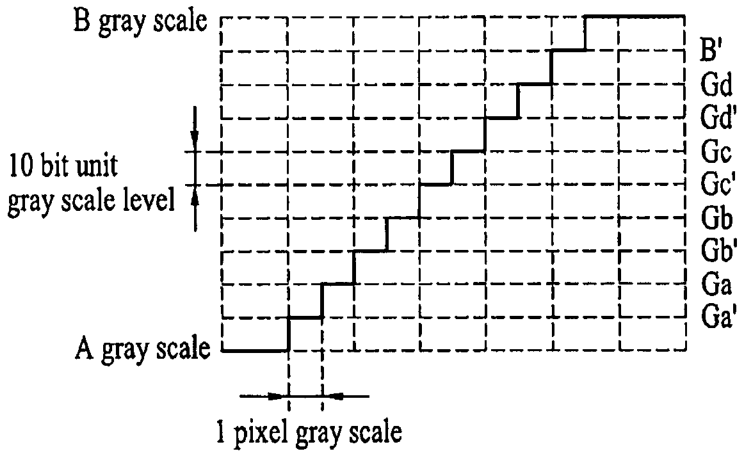
FIG. 6B is an exemplary graph illustrating output data output from the data conversion apparatus shown in FIG. 3.

As a result, the gray scale corrector 210 corrects Ga, Gb, Gc and Gd of the 8 bit gray scale in the gray scale overlap area indicated by the gray scale detection signal (GAS), shown in FIG. 6A, into Ga', Ga, Gb', Gb, Gc', Gc, Gd' and Gd of 10 bit gray scale, shown in FIG. 6B, according to the gray scale change signal (GVS). Thus, four steps between A gray scale and B gray scale in the 8 bit gray scale are increased into eight steps of 10 bit gray scale by the gray scale corrector 210. Accordingly, the output images are more smoothly and continuously displayed.

The above-mentioned apparatus and method of converting the data according to the preferred embodiment of the present invention generates the gray scale detection signal (GAS) and the gray scale change signal (GVS) by detecting the gray scale of pixels being positioned adjacently in the horizontal and vertical directions from the 8 bit input data (Data) and corrects the gray scale of 8 bit input data (Data) into the 10 bit data (Data') according to the generated gray scale detection signal (GAS) and gray scale change signal (GVS), thereby obtaining smooth and vivid images.

Figure 7:
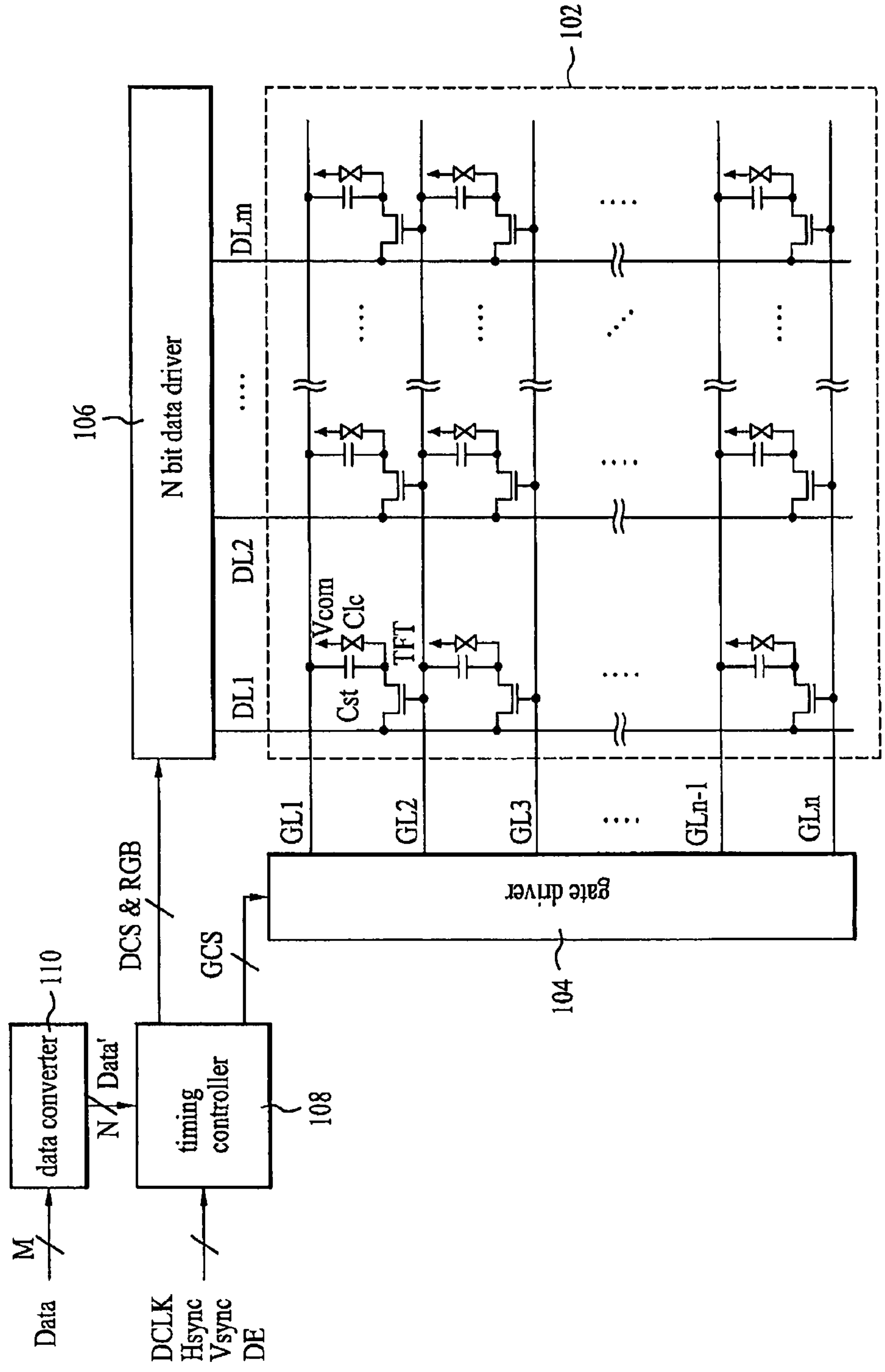
FIG. 7 is a block diagram illustrating an exemplary apparatus for driving an LCD device according to the preferred embodiment of the present invention.

FIG. 7 is a block diagram illustrating an exemplary apparatus for driving an LCD device according to the preferred embodiment of the present invention. As shown in FIG. 7, the LCD device according to the preferred embodiment of the present invention includes an LCD panel 102 that is provided with liquid crystal cells defined by a plurality of gate lines (GL1 to GLn) and data lines (DL1 to DLm), a data converter 110 that generates a gray scale detection signal and a gray scale change signal by detecting a gray scale of pixels that are positioned adjacently in horizontal and vertical directions from M bit input data (Data), and generates N bit correction data (Data') by correcting the gray scale of input data (Data) according to the generated gray scale detection signal and gray scale change signal, a gate driver 104 that sequentially supplies a scan pulse to the gate lines (GL1 to GLn), an N bit data driver 106 that supplies an analog video signal to the data lines (DL1 to DLm), and a timing controller 108 that supplies the N bit correction data (Data') provided from the data converter 110 to the N bit data driver 106 and controls the gate and data drivers 104 and 106.

The LCD panel 102 includes a plurality of thin film transistors (TFT) formed in regions defined by the ‘n’ gate lines (GL1 to GLn) and the ‘m’ data lines (DL1 to DLm) and a plurality of liquid crystal cells that are connected respectively with the thin film transistors (TFT). Each of the thin film transistors (TFT) supplies the analog video signal of data line (DL1 to DLm) to the liquid crystal cell in response to the scan pulse of gate line (GL1 to GLn). The liquid crystal cell is provided with a common electrode and a pixel electrode being connected to the thin film transistor, wherein the liquid crystal layer is placed between the common electrode and the pixel electrode. Accordingly, the liquid crystal layer forms a liquid crystal capacitor (Clc). The liquid crystal cell further includes a storage capacitor (Cst) connected to the gate line so as to store the analog video signal charged to the liquid crystal capacitor (Clc) until the next analog video signal is charged.

The data converter 110 is identical in structure to the data conversion apparatus shown in FIG. 3. The timing controller 108 aligns the N bit correction data (Data') output from the data converter 110 to be suitable for driving the LCD panel 102 and supplies the aligned data to the N bit data driver 106. Also, the timing controller 108 generates a data control signal (DCS) and a gate control signal (GCS) using a dot clock (DCLK), a data enable signal (DE), and horizontally and vertically synchronized signals (Hsync, Vsync) input from the external, and controls the driving timing of N bit data driver 106 and gate driver 104. The data converter 110 may be mounted on the timing controller 108. In particular, the timing controller 108 and the data converter 110 may be integrated into one IC.

The gate driver 104 generates scan pulses, i.e., gate high voltages in response to the gate control signal (GCS) output from the timing controller 108 and sequentially supplies the gate high voltages to the ‘n’ gate lines (GL1 to GLn). The N bit data driver 106 converts the data signal (RGB) supplied from the timing controller 108 into the analog video signal according to the data control signal (DCS) supplied from the timing controller 108, and supplies the analog video signal for one horizontal line to the data lines (DL1 to DLm) by each horizontal period.

The apparatus and method of converting data in the above-mentioned LCD device according to the preferred embodiment of the present invention includes the data converter 110 that generates the gray scale detection signal (GAS) and gray scale change signal (GVS) by detecting the gray scale of pixels being adjacent horizontally and vertically from the 8 bit input data (Data), and corrects the gray scale of 8 bit input data (Data) to the 10 bit data (Data') according to the gray scale detection signal (GAS) and gray scale change signal (GVS). In addition, the apparatus and method of converting data according to the present invention may be applied to plasma display panels and light-emitting devices as well as the above-mentioned LCD device.

The apparatus and method of converting data according to the present invention and the LCD device using the same can improve the gray scale use efficiency in the data IC of 9 bits or more and obtain smooth and vivid images by increasing or decreasing the gray scale of a local pixel according to a global spatial increase of gray scale in the gray scale overlap area detected from the gray scale of input image.

It will be apparent to those skilled in the art that various modifications and variations can be made in the apparatus and method of converting data and an apparatus and method of driving display devices using the same of the present invention without departing from the spirit or scope of the invention. Thus, it is intended that the present invention cover the modifications and variations of this invention provided they come within the scope of the appended claims and their equivalents.

What is claimed is:

1. An apparatus of converting data comprising:

a gray scale detector configured to:

analyze an M bit input data, the M bit input data corresponding to a two-dimensional pixel block unit comprising I * J pixels, where I and J are integers greater than or equal to 3 and respectively correspond to vertical and horizontal directions;

detect, within the pixel block unit, a same gray scale area, comprising pixels with a same gray scale value, in at least one of horizontal, vertical, and diagonal directions;

generate:

a gray scale detection signal indicating the positions of detected pixels within the same gray scale area; and a gray scale change signal indicating a change of gray scale value in each of horizontal, vertical, an diagonal directions, the change of gray scale value and directions being determined between the same gray scale are and at least one different pixel, within the pixel block unit, having a different scale value from and adjacent to the same gray scale area; and compare the gray scale value of pixels in the horizontal, vertical, and diagonal directions within the pixel block unit, comprising the M bit input data, to generate the gray scale detection signal and the gray scale change signal; and a gray scale corrector configured to:

generates an N bit data by correcting the gray scale value of at least one pixel within the same gray scale area according to the gray scale change signal from the gray scale detector, the gray scale value of the at least one pixel, adjacent to the different pixel, within the same gray scale are increasing or decreasing according to the gray scale change signal, where N and M are integers, N being larger than M; and one of:

correct the gray scale value of the at least one pixel within the same gray scale area, adjacent to the different pixel in the horizontal direction within the pixel block unit, according to the gray scale change signal in the horizontal direction, correct the gray scale value of the at least one pixel within the same gray scale area, adjacent to the different pixel in the vertical direction within pixel block unit, according to the gray scale change signal in the vertical direction, or correct the gray scale value of the at least one pixel within the same gray scale area, adjacent to the different pixel in the diagonal direction within the pixel block unit, according to the gray scale change signal in the diagonal direction.

2. The apparatus of claim 1, wherein the gray scale detector further comprises a line memory that stores the M bit input data in a plurality of horizontal lines, wherein the plurality of horizontal lines is at least three horizontal lines.

3. The apparatus of claim 2, wherein:

the gray scale corrector converts the M bit input data of the pixel block unit supplied from the line memory into the N bits, and generates the N bit data by increasing or decreasing the gray scale of the at least one pixel within the same gray scale area according to the gray scale change signal; and the gray scale value of the at least one pixel within the same gray scale are has a level between the same gray scale value and the different gray scale value.

4. An apparatus of driving an LCD device comprising:

an LCD panel configured to display images;

a data conversion apparatus configured to convert an M bit input data into an N bit data, where M and N are integers, N being larger than M;

a gate driver configured to supply a scan pulse to the LCD panel;

an N bit data driver configured to supply an analog video signal to the LCD panel; and a timing controller configured to:

supply the N bit data output from the data conversion apparatus to the N bit data driver; and control the gate and data drivers, wherein the data conversion apparatus includes comprises:

a gray scale detector configured to:

analyze an M bit input data, the M bit input data corresponding to a two-dimensional pixel block unit comprising I * J pixels, where I and J are integers greater than or equal to 3 and respectively correspond to vertical and horizontal directions;

detect, within the pixel block unit, a same gray scale area, comprising pixels with a same gray scale value, in at least one of horizontal, vertical, and diagonal directions;

generate:

a gray scale detection signal indicating the positions of detected pixels within the same gray scale area; and a gray scale change signal indicating a change of gray scale value in each of horizontal, vertical, and diagonal directions, the change of gray scale value and direction being determined between the same gray scale area and at least one different pixel, within the pixel block unit, having a different gray scale value from and adjacent to the same gray scale area; and compare the gray scale value of pixels in the horizontal, vertical, and diagonal directions within the pixel block unit, comprising the M bit input data, to generate the gray scale detection signal and the gray scale change signal; and a gray scale corrector configured to:

generate an N bit data by correcting the gray scale value of at least one pixel within the same gray scale area according to the gray scale change signal from the gray scale detector, the gray scale value of the at least one pixel, adjacent to the different pixel, within the same gray scale area increasing or decreasing according to the gray scale change signal, where N and M are integers, N being larger than M; and one of:

correct the gray scale value of the at least one pixel within the same gray scale area, adjacent to the different pixel in the horizontal direction within the pixel block unit, according to the gray scale change signal in the horizontal direction, correct the gray scale value of the at least one pixel within the same gray scale area, adjacent to the different pixel in the vertical direction within the pixel block unit, according to the gray scale change signal in the vertical direction, or correct the gray scale value of the at least one pixel within the same gray scale area, adjacent to the different pixel in the diagonal direction within the pixel block unit, according to the gray scale change signal in the diagonal direction.

5. The apparatus of claim 4, wherein the gray scale detector further comprises a line memory that stores the M bit input data in a plurality of horizontal lines, wherein the plurality of horizontal line is at least three horizontal lines.

6. The apparatus of claim 5, wherein:

the gray scale corrector converts the M bit input data of the pixel block unit supplied from the lien memory into the N bits, and generates the N bit data by increasing or decreasing the gray scale value of the at least one pixel within the same gray scale area according to the gray scale change signal; and the gray scale value of the at least one pixel within the same gray scale are has a level between the same gray scale value and the different gray scale value.

7. A method of converting data, the method comprising:

analyzing an M bit input data, the M bit input data corresponding to a two-dimensional pixel block unit comprising I * J pixels, where I and J are integers greater than or equal to 3 and respectively correspond to vertical and horizontal directions;

detecting, within the pixel block unit, a same gray scale area, comprising pixels with a same gray scale value, in at least one of horizontal, vertical, and diagonal directions;

generating:

a gray scale detection signal indicating the positions of detected pixels within the same gray scale area; and a gray scale change signal indicating a change of gray scale value in each of horizontal, vertical, and diagonal directions, the change of gray scale value and direction being determined between the same gray scale area and at least one different pixel, within the pixel block unit, having a different gray scale value from and adjacent to the same gray scale area;

comparing the gray scale value of pixels in the horizontal, vertical, and diagonal directions within the pixel block unit, comprising the M bit input data, to generate the gray scale detection signal and the gray scale change signal; and generating an N bit data by correcting the gray scale value of at least one pixel within the same gray scale area according to the gray scale change signal from the gray scale detector, the gray scale value of the at least one pixel, adjacent to the different pixel, within the same gray scale area increasing or decreasing according to the gray scale change signal, where N and M are integers, N being larger than M; and one of:

correcting the gray scale value of the at least one pixel within the same gray scale area, adjacent to the different pixel in the horizontal direction within the pixel block unit, according to the gray scale change signal in the horizontal direction, correcting the gray scale value of the at least one pixel within the same gray scale area, adjacent to the different pixel in the vertical direction within the pixel block unit, according to the gray scale change signal in the vertical direction, or correcting the gray scale value of the at least one pixel within the same gray scale area, adjacent to the different pixel in the diagonal direction within the pixel block unit, according to the gray scale change signal in the diagonal direction.

8. The method of claim 7, wherein:

analyzing the M bit input data includes storing the M bit input data in a plurality of horizontal lines in a line memory; and the plurality of horizontal line is at least three horizontal lines.

9. The method of claim 8, wherein generating the N bit data comprises:

converting the M bit input data of the pixel block unit supplied from the line memory into the N bits; and generating the N bit data by increasing or decreasing the gray scale value of the at least one pixel within the same gray scale area according to the gray scale change signal, the gray scale value of the at least one pixel within the same gray scale area having a level between the same gray scale value and the different gray scale value.

10. A method of driving an image display device to represent images on a display panel, the method comprising:

converting an M bit input data into an N bit data, wherein M and N are integers, N being larger than M;

supplying a scan pulse to the display panel; and converting the N bit data to an analog video signal in synchronization with the scan pulse, and supplying the analog video signal to the display panel, wherein converting the M bit input data into the N bit data comprises:

analyzing n M bit input data, the M bit input data corresponding to a two-dimensional pixel block unit comprising I * J pixels, where I and J are integers greater than or equal to 3 and respectively correspond to vertical and horizontal directions;

detecting, within the pixel block unit, a same gray scale area, comprising pixels with a same gray scale value, in at least one of horizontal, vertical, and diagonal directions;

generating:

a gray scale detection signal indicating the positions of detected pixels within the same gray scale area; and a gray scale change signal indicating a change of gray scale value in each of horizontal, vertical, and diagonal directions, the change of gray scale value and direction being determined between the same gray scale area and at least one different pixel, within the pixel block unit, having a different gray scale value from and adjacent to the same gray scale area;

comparing the gray scale value of pixels in the horizontal, vertical, and diagonal directions within the pixel block unit, comprising the M bit input data, to generate the gray scale detection signal and the gray scale change signal; and generating an N bit data by correcting the gray scale value of at least one pixel within the same gray scale area according to the gray scale change signal from the gray scale detector, the gray scale value of the at least one pixel, adjacent to the different pixel, within the same gray scale area increasing or decreasing according to the gray scale change signal, where N and M are integers, N being larger than M; and one of:

correcting the gray scale value of the at least one pixel within the same gray scale area, adjacent to the different pixel in the horizontal direction within the pixel block unit, according to the gray scale change signal in the horizontal direction, correcting the gray scale value of the at least one pixel within the same gray scale area, adjacent to the different pixel in the vertical direction within the pixel block unit, according to the gray scale change signal in the vertical direction, or correcting the gray scale value of the at least one pixel within the same gray scale area, adjacent to the different pixel in the diagonal direction within the pixel block unit, according to the gray scale change signal in the diagonal direction.

11. The method of claim 10, wherein:

analyzing the M bit input data comprises storing the M bit input data in a plurality of horizontal lines in a line memory; and the plurality of horizontal lines is at least three horizontal lines.

12. The method of claim 11, wherein generating the N bit data comprises:

converting the M bit input data of the pixel block unit supplied from the line memory into the N bits; and generating the N bit data by increasing or decreasing the gray scale of the at least one pixel within the same gray scale area according to the gray scale change signal, the gray scale value of the at least one pixel within the same gray scale are having a level between the same grays scale value and the different gray scale value.

* * * * *